United States Patent Office 3,531,372
Patented Sept. 29, 1970

3,531,372
PROCESS OF PRODUCING DIAMINOPIMELIC ACID

Kiyoshi Nakayama, Sagamihara-shi, and Hiroshi Hagino, Tokyo-to, Japan, assignors to Kyowa Hakko Kogyo Kabushiki Kaisha, Tokyo-to, Japan, a body corporate of Japan No Drawing. Continuation-in-part of application Ser. No. 559,380, June 22, 1966. This application May 8, 1969, Ser. No. 823,155
Claims priority, application Japan, July 3, 1965, 40/39,564
Int. Cl. C12d *13/06*
U.S. Cl. 195—29 6 Claims

ABSTRACT OF THE DISCLOSURE

A process of producing diaminopimelic acid by means of inoculating a fermentation medium with a diaminopimelic acid microorganism belonging to the auxotrophic mutants of *Bacilus subtilus.*

CROSS REFERENCE TO RELATED APPLICATIONS

This application is a continuation-in-part of Ser. No. 559,380, filed June 22, 1966, Kiyoshi Nakayama et al., now abandoned.

BACKGROUND OF THE INVENTION

This invention is concerned with a process of producing diaminopimelic acid. More particularly, this inventon is concerned wth a process of producing diaminopimelic acid by fermentation utilizing microorganism.

Diaminopimelic acid is present in cell walls of various microorganisms and acts as a precursor of lysine biosynthesis and is useful for medical and biological research.

In the past a microorganism capable of producing a large amount of diaminopimelic acid in the fermented broth from cheaper materials containing saccharide has long been desired.

Therefore, it is an object of the present invention to provide a process for producing diaminopimelic acid in an improved manner and with cheaper producing costs.

Another object of the present invention is to provide a process of producing diaminopimelic acid by fermentation.

Other objects and features of the present invention will be apparent to the reader of the foregoing specification and claims.

According to this invention a new and useful microorganism, medium, composition and cultivation method for the production of diaminopimelic acid in an improved and economic manner hereinafter described has been discovered.

According to the present invention, process of producing diaminopimelic acid by fermentation utilizing a mutant strain obtainable from *Bacilus subtilus,* as well as a method of recovering and concentrating it from the crude solution, purifying it and preparing it in purified form has been provided.

With regard to the strains applicable for the fermentation, it has been discovered that large amounts of diaminopimelic acid can be economically produced by fermentation by inoculating a fermentation medium containing lysine, a carbohydrate, a nitrogen liberating material with a diaminopimelic acid producing microorganism belonging to auxotrophic mutants of the *Bacilus subtilus* strain, which requires at least lysine for growth, treating the inoculated medium under aerobic conditions for about 3 to 5 days, at a tempreature of 25° C. to 35° C. This acid can be recovered from the fermentation broth by any of the conventional separating processes such as filtration of the solid and cellular material from the broth, concentrating said broth and passing said concentrated broth through a conventional ion exchanger containing a cationic ion exchange resin to remove the acid from the broth. The acid can be flushed out of the ion exchange resin by any conventional means such as utilizing aqueous ammonia. The acid can be removed in purified form from the eluted solution by means of precipitation with a lower aliphatic alcohol such as ethanol. In this manner, diaminopimelic acid can be produced by fermentation in a simple and economical manner.

With regard to the strains applicable for the fermenation to form the broths containing a large amount of diaminopimelic acid according to the present invention, it is possible to use auxotrophic mutant strains obtainable from *Bacilus subtilus* which is capable of producing diaminopimelic acid such as the strain obtained by subjecting *Bacilus subtilus* to irradiating radioactive rays such as X-rays or ultra-violet rays. It has been found that the obtained mutants require at least lysine for growth and are capable of forming diaminopimelic acid in a fermentation medium containing lysine, saccharide and nitrogen liberating compound. Typical mutant strains of *Bacilus subtilus* which can be utilized in accordance with this invention include KY 7525 (ATCC No. 19550) and KY 7526 (ATCC No. 19549), said strains having been deposited on May 3, 1966, and made available to the public on May 9, 1968 at the American Type Culture Collection on an unrestricted basis.

The mutant strains which can be utilized in accordance with this invention are prepared prior to their inoculation in the fermentation medium in any of the nutrient mediums which are capable of growing *Bacilus subtilus* and which have at least lysine added thereto. It has been found that these mutants are incapable of growing in a nutrient medium suitable for cultivating the parent strain without the addition of at least lysine. Any conventional nutrient medium for cultivating *Bacilus subtilus* with the addition of at least lysine can be utilized for cultivating the mutant strains. These mediums generally contain in addition to lysine, a carbonhydrate such as glucose, starch hydrolyzate, etc. any assimilable nitrogen source (e.g., urea, ammonium chloride and other inorganic compounds or ammonium salts of inorganic acids), any inorganic salt of mixtures thereof such as magnesium sulfate, manganese sulfate, ferrous sulfate, potassium ion, natrium ion, etc. as well as any conventional organic nutrient such as corn steep liquor, yeast extract, sodium salt of RNA, casein hydrolyzate, polypeptone, meat extract, etc. Calcium carbonate can be also used as a neutralizer and to adjust the pH to about 7.

A typical nutrient medium for *Bacilus subtilus* which can be modified in accordance with this invention is a modification of the Gray and Tatum's medium and is prepared by adding the following substances to one liter of distilled water:

| | | |
|---|---|---|
| Glucose | g. | 1 |
| $NH_4Cl$ | g. | 5 |
| $Na_2SO_4$ | g. | 1 |
| Lysine | mg. | 100 |
| $K_2HPO_4$ | g. | 3 |
| $KH_2PO_4$ | g. | 1 |
| $CaCl_2 \cdot 2H_2O$ | g. | 0.001 |
| $NH_4NO_3$ | g. | 1 |
| $MgSO_4 \cdot 7H_2O$ | g. | 0.1 |
| Solution [1] | ml. | 1 |

[1] Said solution being prepared by adding 200 mg. Zn, 200 mg. Fe, 100 mg. Cu, 20 mg. Mn and 10 mg. B to one liter distilled water. The above was adjusted to a pH of 7.0.

Furthermore, the modified nutrient medium can be prepared by adding 100 mg. of at least one member of the following group of amino acids per one ml. of said lysine-containing nutrient medium: L-glutamic acid, L-aspartic acid, histidine, arginine, glycne, alanine, leucine, valine, isoleucine, proline, serine threonine phenylalanine, tyrosine, cystine, methionine, tryptophan.

Alternately, 100 mg. of citamine-free casamino acid in powder form (a trade name of the purified product made by hydrolyzed casein, available from Nutritional Biochemical Corporation, U.S.A.) can be added to said medium. It is also possible to add to the final nutrient medium 10 grams of at least one member of the following group of the nucleic acid compositions per one ml. of said nutrient medium containing lysine: adenine, guanine, xanthine, hypoxanthine, uracil, cytosine, thymine.

It may be possible to utilize any other mutant strain derived from the aforementioned auxotrophic mutants other than the specific aforementioned strains for this purpose, as far as such derived mutants can produce a large amount of diaminopimelic acid in a fermentation broth.

The seed culture thus produced is inoculated into the fermentation medium to produce the diaminopimelic acid, in accordance with this invention. This fermentation medium also contains lysine and a carbohydrate. Typical carbohydrates which can be utilized in this invention include monosaccharides such as glycoaldehyde, erythrose, arabinose, xylose, dextrose, mannose, levulose, etc., disaccharides such as lactose, maltose, sucrose, etc., polysaccharides, such as raffinose, lupeose, dextrins, starch, hydrolyzates, etc.

The fermentation medium should also contain a nitrogen liberating compound. Any conventional nitrogen liberating compound can be utilized in accordance with this invention such as the urea, ammonium chloride as well as any other inorganic ammonium, salt, etc.

The fermentation medium should also contain an inorganic metallic salt whose function it is to cultivate the microorganism. Any metallic salt such as the aforementioned salt can be utilized in the fermentation medium. Preferably a mixture of such salts is utilized in the fermentation broth. Any conventional organic nutrient such as corn steep liquor, yeast extract, sodium salt of RNA, casein hydrolyzate, polypeptone, meat extract, etc. or mixtures thereof are incorporated into the fermentation media. Calcium carbonate is also included in the fermentation medium to adjust the pH.

A typical fermentation media for use in accordance with this invention is as formed from the following constituents.

| | | |
|---|---|---|
| Glucose | g./dl. | 5 |
| Magnesium sulfate | g./dl. | 0.02 |
| Urea | g./dl. | 0.4 |
| Manganese ion | p.p.m. | 2 |
| Yeast extract [1] | g./dl. | 0.2 |
| Sodium salt of RNA | mg./dl. | 10 |
| Polypeptone | g./dl. | 0.1 |
| Ammonium chloride | g./dl. | 0.4 |
| Dibasic potassium phosphate | g./dl. | 0.1 |
| Fe ion | p.p.m. | 2 |
| Casein hydrolyzate | g./dl. | 0.2 |
| Corn steep liquor | ml./dl. | 0.2 |
| Meat extract | g./dl. | 0.1 |
| Calcium carbonate | g./dl. | 2 |

[1] Containing 50 mg./dl. of lysine.

The medium is preferably sterilized by autoclaving for about 10 minutes at a pH of about 7.0 and at 115° C. It is preferred to adjust the pH to about 7.0 so as to achieve favorable growth and the production of the highest yield of the microorganism in early stages.

The method of preparing and cultivating the fermentation medium with the mutant strain is as follows:

The mutant strain (obtainable from *Bacilus subtilus*) capable of producing diaminopimelic acid-containing fermented broths, which is prepared by the incubation in the nutrient medium by agitation for about 16–24 hours at 30° C., is inoculated into 30 ml. of the fermentation medium in an Erlenmeyer flask. The inoculated medium is then subjected to shanking for about 3–5 days at 25–35° C. under aerobic conditions to produce and accumulate diaminopimelic acid in the fermented broths. After the fermentation is completed, myceliums or cells are removed from the broth by filtration to obtain a clarified solution which is concentrated. From the concentrated solution containing crude diaminopimelic acid a relatively higher concentration of this product can be obtained.

This is accomplished by passing the concentrated solution into an ion exchanger containing a cationic ion exchange resin which removes the acid from the solution. Any conventional cationic ion exchange resin can be utilized in accordance with this invention. The acid product can be recovered from the ion exchange resin by flushing with an aqueous solution. The pure product can be recovered from the aqueous solution in purified form by precipitation.

The following examples illustrate but do not limit the invention:

EXAMPLE 1

A mutant strain derived from *Bacilus subtilus*, called KY 7526 (ATCC 19549) was inoculated with 30 ml. of a medium having the following composition (at pH 7.0) in an Erlenmeyer flask and was cultured for 4 days at 30° C. to yield a fermented broth containing 4.2 mg./ml. of diaminopimelic acid:

| | Percent |
|---|---|
| Glucose | 5 |
| $MgSO_4 \cdot 7H_2O$ | 0.025 |
| $(NH_4)_2SO_4$ | 1 |
| Yeast extract [1] | 0.3 |
| $K_2HPO_4$ | 0.05 |
| $CaCO_3$ | 1 |

[1] Containing 0.005% of lysine.

The fermented broth was separted from cells and myceliums by means of the centrifugation and was then passed through cation exchange resin colums packed with a C1 type cation exchange resin Dowex (150X2) (a trademark name for a polystyrene strongly acidic cation exchange resin available from Dow Chemical Co., Midland, Mich., U.S.A.) to adsorb the diaminopimelic acid. From the said ion exchange resin, diaminopimelic acid was eluted with a 0.03% aqueous ammonia, collected and concentrated and afterwards was added to ethanol to give a precipitated diaminopimelic acid. Yield—28 grams.

EXAMPLE 2

A fermentation was carried out with a mutant strain derived from *Bacilus subtilus*, called KY 7525 (ATCC 19550) in an analogous manner to that described in Example 1, thereby to yield a fermented broth containing 4.5 mg./ml. of diaminopimelic acid. This was treated analogously to give a precipitated product.

What is claimed is:

1. A process of producing diaminopimelic acid by means of fermentation comprising inoculating a fermentation medium containing lysine, a carbohydrate and a nitrogen liberating material with a diamino pimelic acid producing the auxotrophic mutant of *Bacillus subtilus* which requires at least lysine for growth selected from the group consisting of *Bacillus subtilus* KY 7526 (ATCC No. 19549) and *Bacillus subtilus* KY 7525 (ATCC No. 19550), treating the inoculated medium under aerobic conditions for about 3–5 days at a temperature of about 25° C. to about 35° C. so as to form a fermentation broth containing diaminopimelic acid, and recovering said diaminopimelic acid from said fermentation broth.

2. The process of claim 1 wherein said fermentation media further contain an aminoacid other than lysine.

3. The process of claim 1 wherein said fermentation media further contains citamin-free casamino acid.

4. The process of claim 1 wherein said fermentation media has a pH of about 7.

5. The process of claim 1 wherein said fermentation medium further contains at least one member selected from the group consisting of adenine, guanine, xanthine, hypoxanthine, uracil, cytosine and thymine.

6. A process of producing diaminopimelic acid by means of fermentation comprising inoculating a fermentation medium containing lysine, a carbohydrate and a nitrogen liberating material with a diaminopimelic acid-producing the auxotrophic mutant of *Bacillus subtilus* which requires at least lysine for growth selected from the group consisting of *Bacillus subtilus* KY 7525 (ATCC No. 19549) and *Bacillus subtilus* KY 7525 (ATCC No. 19550), treating the inoculated medium under aerobic conditions for about 3–5 days at a temperature of about 25 to 35° C. so as to form a fermentation broth containing diaminopimelic acid, filtering the cellular material therefrom to produce a clear solution, passing said clear solution through a cationic ion exchange resin to absorb said acid and flushing said acid from said resin.

References Cited

UNITED STATES PATENTS 2,955,986 10/1960 Huang et al. -------- 195—47

OTHER REFERENCES

Chemical Abstracts, vol. 63, September 1965, p. 7371e.

LIONEL M. SHAPIRO, Primary Examiner